3,677,922
POLYMERIZATION OF TETRAOXANE IN THE PRESENCE OF AN ACETAL AND A SULFUR INITIATOR
Akihiko Ito and Yoshiaki Nakase, Takasaki, Katsumi Kojima, Oimachi, Masaru Yoshida, Takasaki, Tadashi Iwai, Kanagawa-ken, Koichiro Hayashi, Sapporo, and Seizo Okamura, Kyoto, Japan, assignors to Japan Atomic Energy Research Institute, Tokyo, Japan
No Drawing. Filed June 19, 1970, Ser. No. 47,866
Claims priority, application Japan, June 20, 1969, 44/48,285
Int. Cl. C08d 1/00; C08f 1/16, 3/40
U.S. Cl. 204—159.21
21 Claims

ABSTRACT OF THE DISCLOSURE

A thermally stabilized oxymethylene polymer is obtained by polymerizing tetraoxane in the presence of an acetal and a polymerization initiator selected from the group consisting of sulfur and an organic sulfur compound. Irradiation by an ionizing radiation or an actinic light can advantageously be employed in the polymerization. Said thermal stability is further improved, when tetraoxane is polymerized by using a specific combination of an acetal such as methylal, ethylal, 1,3-dioxolane, 1,3-dioxane, etc. and an initiator such as thiiranes, thiocyanates, isothiocyanates, ethylenethiourea, trithianoxides, etc.

BACKGROUND OF THE INVENTION

It is well known to polymerize formaldehyde, trioxane or tetraoxane by means of a cationic catalyst such as a Lewis acid or an ionizing radiation. However, the catalysts used in the conventional process are highly reactive and unstable, and therefore, they must be handled with extreme care. There is a further disadvantage in the use of a Lewis acid in that the Lewis acid must be neutralized after the polymerization is completed. The disadvantage of radiation polymerization is that the polymerization rate is low.

The oxymethylene polymers obtained by polymerizing formaldehyde, trioxane or tetraoxane by means of a known cationic catalyst such as Lewis acid or an ionizing radiation are inadequate in thermal stability and are easily depolymerized. Therefore, these polymers require some additional stabilization treatment such as the blockings of their chain ends in order that they may be commercially practicable. According to one conventional process, a produced oxymethylene polymer is further treated with acetic anhydride in order to acetylate the chain end thereof; in another process, formaldehyde or trioxane is polymerized in the presence of one or more copolymerizable substances so that a thermally stable copolymer is obtained.

As processes employing a sulfur compound to produce thermally stable oxymethylene polymer, the following inventions are known: German Pat. No. 1,176,862 corresponding to Japanese patent publication No. 7631/67 (a process for polymerizing formaldehyde or its linear oligomer in the presence of a cyclic sulfur compound), British Pat. No. 989,942 (a process for producing a copolymer of trioxane with a cyclic sulfur compound and a cyclic oxygen compound) and British Pat. No. 1,036,992 (a process for producing a copolymer of trioxane and propylene sulfide). However, in these processes, an acidic catalyst is used and therefore the abovementioned disadvantages are incident to these processes.

The inventors have found that polymeric tetraoxane can be prepared quickly and in high yield by employing an initiator consisting of sulfur or an organic sulfur compound (U.S. application filed in May 1970). Said invention is characterized in that polymerization of tetraoxane is initiated by sulfur or an organic sulfur compound, whereas, said prior art processes relate to polymerization of formaldehyde, a linear oligomer thereof or trioxane which is not initiated by sulfur or an organic sulfur compound, and require employment of a suitable initiator such as a Lewis acid or an ionizing radiation.

Also, processes for preparing thermally stabilized oxymethylene polymers were invented, in which tetraoxane is polymerized in solid phase in the presence of a cyclic acetal and/or an acyclic acetal (U.S. Ser. No. 1,051, etc.).

The present invention is an improvement on the abovementioned inventions. The present invention comprises polymerizing tetraoxane in the presence of a cyclic acetal and/or an acyclic acetal and an initiator consisting of sulfur or an organic sulfur compound, and provides a thermally stabilized oxymethylene polymer in high yield within a relatively short polymerization time.

SUMMARY OF THE INVENTION

This invention relates to a novel process for preparing a thermally stabilized oxymethylene polymer and to said novel oxymethylene polymer, and comprises polymerizing tetraoxane in the presence of at least one acetal and a polymerization initiator selected from sulfur and an organic sulfur compound.

Said acetal is represented by the general Formulas I and/or II.

(I) 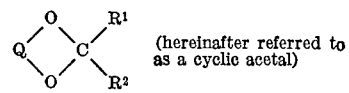 (hereinafter referred to as a cyclic acetal)

wherein Q is a member selected from the group consisting of an unsubstituted or substituted aliphatic hydrocarbon residue having 2 to 10 carbon atoms and an unsubstituted or substituted aliphatic hydrocarbon residue containing C—O—C linkages and having 2 to 10 carbon atoms, the substituent on the aliphatic hydrocarbon residue being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms. The cyclic acetals may be exemplified by 1,3-dioxolane, 1,3-dioxane, 1,3-dioxepane, 1,3-dioxecane, 1,3,5-trioxepane, 1,3,6-trioxocane, 4-methyl-1,3-dioxolane, 4-phenyl-1,3-dioxane, 5-ethyl-4-phenyl-1,3-dioxane, 4-methyl-4-phenyl-1,3-dioxane, 2-methyl-4-methylene-1,3-dioxolane, 1,3-dioxep-5-ene, 1,3-dioxen-6-ene, 5-ethyl-1,3-dioxep-5-ene, and 2-isopropyl-1,3-dioxep-5-ene.

(II)
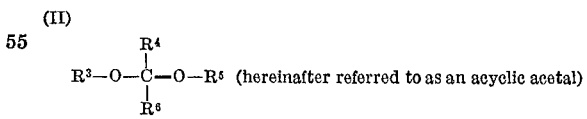

wherein $R^3$ and $R^5$ each are members selected from the group consisting of an aliphatic hydrocarbon residue having 1 to 4 carbon atoms and a substituted aliphatic hydrocarbon residue having 1 to 6 carbon atoms, the substituent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms. The acyclic acetals may be exemplified by dimethoxymethane (methylal), diethoxyethane, 1,1-diethoxypropane, dipropoxymethane, dibutoxymethane, methoxybutoxymethane, 1,1-dibutoxypropane, 1,1-diethoxybutane, and 2,2-dimethoxypropane.

The organic sulfur compounds to be used in this invention include the following compounds. The examples of the divalent sulfur compound are thioaldehydes (e.g., trithioformaldehyde, etc.), thioketones (e.g., methyl phenyl thioketone, etc.), thioalcohols (e.g., methyl mercaptan, ethyl mercaptan, methyl thioglycolate, etc.), thiocarbonic anhydrides (e.g., carbon disulfide, etc.), thiocarbonic ester (e.g., ethylene trithiocarbonate, etc.), thioethers (e.g., methyl sulfide, ethyl sulfide, dimethyl disulfide, tetrahydrothiophene, thiiranes (i.e. episulfides), etc.), thioamides (e.g., acetothioamide, etc.), thiourea and its derivatives (e.g., ethylenethiourea, methyl thiourea, etc.), thiocyanates (methyl thiocyanate, ethyl thiocyanate, etc.) isothiocyanates (e.g., methyl isothiocyanate, ethyl isothiocyanate, etc.), alkylxanthogenates (e.g., ethyl ethylxanthogenate, etc.). The examples of tetravalent or hexavalent sulfur compounds are sulfates (e.g., dimethyl sulfate, diethyl sulfate, etc.), sulfites (e.g., dimethyl sulfite, diethyl sulfite, glycol sulfite, etc.), alkyl sulfones (diethyl sulfone, etc.), alkylsulfoxides (e.g., dimethyl sulfoxides, etc.), sulfonium compounds (e.g., trimethyl sulfonium iodide, etc.), thiophene-derivatives-s-oxide (e.g., dihydrothiophene-1-dioxide, tetrahydrothiophene-1-oxide, tetrahydrothiophene-1-dioxide, etc.), dithiorane-derivatives-s-oxide (e.g., 1,3-dithioranedisulfone, γ-sultone, etc.), oxathianderivatives-s-oxide (e.g., δ-sultone, 1,3-oxathian-1-dioxide, etc.), and trithianoxides (e.g., trimethylenetrisulfoxide, trimethylenetrisulfone, etc.).

Typical examples of thiiranes, thiocyanates, isothiocyanates and trithianoxides which are very useful for thermal stabilization of the produced polymers are shown below. Thiiranes include ethylene sulfide, propylene sulfide, 1-butene sulfide, 2-butene sulfide, isobutene sulfide, trimethylethylene sulfide, tetramethylethylene sulfide, cyclopentene sulfide, cyclohexene sulfide, 4-methyl-cyclohexene sulfide, cycloheptene sulfide, cyclooctene sulfide, styrene sulfide, 3-mercaptopropylene sulfide, 3-chloropropylene sulfide; and the thiocyanates include methyl thiocyanate, ethyl thiocyanate, n-propyl thiocyanate, isopropyl thiocyanate, n-butyl thiocyanate, isobutyl thiocyanate, n-amyl thiocyanate, isoamyl thiocyanate, allyl thiocyanate, benzyl thiocyanate, and phenyl thiocyanate; and the isothiocyanates include methyl isothiocyanate, ethyl isothiocyanate, n-propyl isothiocyanate, isopropyl isothiocyanate, n-butyl isothiocyanate, benzyl isothiocyanate and phenyl isothiocyanate; and the trithianoxides typically include trimethylenetrisulfoxide and trimethylenetrisulfone.

In the process of this invention, in addition to the use of the above-mentioned sulfur or sulfur compounds as an initiator, the irradiation of an ionizing radiation or an actinic light can be utilized. Combining the use of sulfur or sulfur compounds with an ionizing radiation serves to improve the polymerization rate. The polymerization effected by combining the two is essentially different from the normal radiation-induced polymerization, since the radiation-induced polymerization of tetraoxane without the initiator can only proceed in solid phase, whereas when the two are combined the polymerization even in liquid phase is remarkably accelerated by irradiation. The useful radiations include alpha rays, beta rays, gamma rays, electron beam, X-rays, neutron beam, beams of heavy particles and combination thereof. An actinic light such as ultraviolet light from a mercury lamp etc. can also be used.

According to this invention, a thermally stabilized oxymethylene polymer is obtained by adding to tetraoxane, an acetal and an initiator selected from sulfur or organic sulfur compounds. The unexpected result of this invention is that the polymerization rate (velocity) increases in the presence of an acetal in comparison with the polymerization rate when only sulfur or an organic sulfur compound is employed. Said thermal stability of oxymethylene polymer is further improved when tetraoxane is polymerized by employing a specific organic sulfur compound such as thiiranes, thiocyanates, isothiocyanates, trithianoxides, and ethylenethiourea and its derivatives, in the presence of an acetal or acetals.

In accordance with this invention, polymerization is carried out as follows:

First, an acetal and an initiator selected from sulfur and an organic sulfur compound (hereinafter referred to as "additives") are mixed with tetraoxane. The additives can be added simultaneously or separately by various ways. When a rather volatile compound is used, the polymerization system is confined in a sealed vessel. In the case of solid phase polymerization, the additives are added to crystalline tetraoxane in the form of drops, spray or vapor, or the additives are melt-mixed with tetraoxane and solidified. In liquid phase polymerization, the additives are added to the liquid phase containing tetraoxane, or they are mixed with tetraoxane and then the mixture is melted or dissolved into a solution. Furthermore, in liquid phase polymerization, polymerization is carried out by contacting a gaseous initiator consisting of organic sulfur compounds with the surface of a liquid mixture of tetraoxane and an acetal.

When the additives are solids or are used in low concentration, it is advantageous to use them in the form of a solution in a solvent inactive to both tetraoxane and the additives such as n-hexane or benzene etc.

In order to obtain the better results, it is preferable to irradiate tetraoxane or an initiator or a mixture thereof by an ionizing radiation or an actinic light. Whether the irradiation is carried out before or after mixing the additives to tetraoxane, there is no substantial difference in the effect. Namely, there are four ways of applying irradiation; the mixture of tetraoxane and additives is irradiated; tetraoxane is irradiated first and then mixed with the additives; the additives are irradiated first and mixed with tetraoxane; or sulfur or an organic sulfur compound is irradiated and then mixed with tetraoxane and an acetal.

The amount of acetal and acetals to be employed is generally 0.001–15%, preferably 0.01–10% by weight of tetraoxane. The amount of an initiator (sulfur or an organic sulfur compound) is generally $10^{-6}$—10%, preferably $10^{-4}$—5% by weight of tetraoxane.

An acetal or mixture of two or more acetals is employed in this invention. A synergistic effect is exhibited on the thermal stability of the polymer obtained, when both an acyclic acetal and a cyclic acetal are employed in the polymerization. An acetal or acetals are added to tetraoxane prior to the polymerization, and/or can be added successively or intermittently in the course of the polymerization.

When the in-source polymerization is employed, the dose rate is generally in the range of $10^2$–$10^8$ rad/hr.; and in the case of the post-polymerization, the dose is generally $10^2$—$10^8$ rad. In the case of in-source polymerization (including light irradiation), the irradiation temperature is identical with that of polymerization. In the case of postpolymerization (including light irradiation), the irradiation temperature must be within the range in which tetraoxane is in the solid state. When irradiation is carried out at a temperature higher than 30° C., in-source polymerization proceeds except for the case in which the irradiation time is very short. However, post-polymerization can, of course, be effected thereafter. Though the polymerization can be conducted at a temperature ranging from 30° C. to 150° C., desirable results are obtained when polymerization is carried out at 90° C. or higher temperatures. Even when the temperature of the heating bath is higher than the melting point of tetraoxane, polymerization may proceed in the solid state during temperature raise. There is no restriction, either, with respect to the atmosphere in which polymerization is carried out. That is, polymerization can be carried out either in air, vacuum or an inert gas. However, the polymerization rate is higher in an atmosphere containing oxygen than in one not containing oxygen. In-source polymerization means polymerization which proceeds during irradiation by means of an ionizing radiation or an actinic light. Post-polymerization means polymerization which proceeds after irradiation, in the absence of the radiation source. The term "solid phase polymerization" referred to herein means polymerization carried out when the tetraoxane exists in the solid state (including dispersion), and "liquid phase polymerization" means polymerization carried out when the system containing tetraoxane is in the liquid state. The solid phase polymerization, particularly at a temperature around 105° C., is preferable for obtaining a polymer with improved heat stability, since the crystal structure of tetraoxane in the solid phase polymerization according to this invention has an effect upon the polymer structure in that fibrils of the polymer orientate in the direction of the $b$ axis of the crystal lattice of tetraoxane, and since the additives are uniformly distributed onto tetraoxane in the solid phase and the reaction of the additives is controlled by the geometric distribution of the additives rather than the reactivity ratio of tetraoxane and additives. Furthermore, powdery polymer is obtained directly from powdery monomer by the solid phase polymerization and stirring power of a polymerization reactor does not change very much throughout whole polymerization process even when the polymer yield attains almost 100%. After polymerization, the reaction mixture is washed with a solvent such as acetone, benzene, etc. which is a good solvent for both tetraoxane and the additives so that the produced polymer may be separated from the unreacted materials.

As seen in the following working examples, if suitable polymerization conditions are set up, polymer is obtained in almost 100% yield, and therefore the process of this invention is extremely advantageous from the commercial view in that no means for recovery of unreacted monomer is required.

The main characteristics and advantages obtained by this invention can be summarized as follows:
(i) It requires no neturalization step since no acidic catalyst is employed.
(ii) A thermally stabilized oxymethylene polymer is obtained in high yield in a relative short polymerization time.
(iii) The initiator used is cheap and readily available.
(iv) Both polymerization time and the amount of a polymerization initiator used can be reduced by subjecting to an ionizing radiation or an actinic light.
(v) By selecting suitable conditions, the polymerization yield is increased owing to a synergistic effect of an acetal and sulfur or an organic sulfur compound, and at the same time the thermal stability of the polymer is improved. The thermal stability is markedly improved when both an acyclic acetal and a cyclic acetal are employed in the polymerization.
(vi) The oxymethylene polymer obtained by this invention is suitable for all the conventional uses. Furthermore, it is expected that new uses, based on its excellent properties such as high heat-stability etc., will be found for the polymer.

DESCRIPTION OF THE PREFERRED EMBODIMENTS

Now the invention is illustrated by way of working examples. These examples are included for better understanding of the invention and should not be taken as limiting the scope of the invention. The product of each of the examples is a white crystalline substance. The melting points of the polymers obtained according to the following examples range from 167 to 174° C. The viscosity number $[\eta]$ is determined with respect to a solution in p-chlorophenol containing 2% α-pinene at 60° C. The thermal stability of the polymer is indicated as $K_{222}$ (%/minute) which means average thermal decomposition rate when the polymer is heated at 22° C. for 1 hour under nitrogen stream. The amount of the additives is indicated in percentage on the basis of the weight of tetraoxane.

Example 1

One gram of tetraoxane purified by sublimation was put in a glass ampoule, and 1,3-dioxolane and the polymerization initiator were admixed thereto. The ampoule was sealed in air and polymerization was carried out, with or without the help of $10^6$ rad irradiation of gamma rays, at 10° C. After the polymerization was finished, the unreacted tetraoxane was removed by washing with acetone. The product was dried at room temperature in vacuum for 24 hours, and a white crystalline polymer was obtained. Conditions of polymerization and results are summarised in Table 1.

TABLE 1

| Polymerization conditions | | | | | Results | | |
|---|---|---|---|---|---|---|---|
| Amount of 1,3-dioxolane (percent) | Irradiation | Initiator (percent) | Time (hr.) | Temp. (° C.) | Yield (percent) | $K_{222}$ (percent/min.) | $(\eta)$ |
| 3.0 | Irradiated | Dimethylsulfone (3.5) | 2 | 105 | 99 | 0.60 | 0.5 |
| (Control) | do | do | 2 | 105 | 94 | 0.91 | 0.8 |
| 5.0 | do | Methylthiocyanate (0.01) | 0.5 | 105 | 99 | 0.60 | 0.9 |
| (Control) | do | do | 1 | 105 | 94 | 0.81 | 2.1 |
| 3.0 | Non-irradiated | Dimethylsulfone (3.5) | 2 | 105 | 2 | | |
| 5.0 | do | Methylthiocyanate (0.01) | 1 | 105 | 90 | 0.85 | 5.2 |

Example 2

To 1 g. of tetraoxane purified by sublimation, various kinds of acetal were added, and polymerization was carried out by using various kinds of polymerization initiator. Temperature and time of the polymerization were 105° C. and 1 hour respectively. The reaction mixture was treated in the same way as in Example 1. The results are shown in Table 2.

TABLE 2

| Polymerization conditions | | Results | | |
|---|---|---|---|---|
| Acetals (percent) | Initiator (percent) | Yield (percent) | $K_{222}$ (percent/min.) | $(\eta)$ |
| Methylal (0.3) | Carbon disulfide (5.0) | 99 | 0.82 | 1.7 |
| Methylal (3.0) | Carbon disulfide (1.3) | 95 | 0.10 | 0.5 |
| Methylal (0.3) | Methyl thiocyanate (3.0) | 91 | 0.45 | 2.4 |
| Methylal (3.0) | Methyl thiocyanate (1.0) | 96 | 0.20 | 0.5 |
| Methylal (0.3) | Methyl thioglycolate (3.0) | 50 | 0.91 | 0.7 |
| Methylal (3.0) | Methyl thioglycolate (1.0) | 96 | 0.72 | 0.5 |
| Methylal (0.3) | Dimethyl sulfite (2.4) | 94 | 0.92 | 0.8 |
| Methylal (3.0) | Dimethyl sulfite (1.2) | 98 | 0.21 | 0.5 |
| 1,3-dioxolane (5.0) | Carbon disulfide (1.3) | 99 | 0.20 | 1.5 |
| Do | Methyl thiocyanate (1.0) | 96 | 0.45 | 1.8 |
| Do | Methyl thioglycolate (1.0) | 100 | 0.90 | 0.5 |
| Do | Dimethyl sulfite (1.2) | 100 | 1.35 | 0.7 |
| 1,3-dioxane (5.0) | Carbon disulfide (1.3) | 95 | 0.25 | 1.4 |

Example 3

To 10 g. of tetraoxane purified by sublimation, methylal or 1,3 - dioxolane was admixed. Polymerization was carried out by adding elemental sulfur or carbon disulfide diluted with n-hexane in an amount of 1% or less. In some cases, the reaction system was irradiated with $10^6$ rad of gamma rays at room temperature. Temperature of polymerization was 105° C. Other conditions and results are summarized in Table 3.

TABLE 3

| Polymerization conditions | | | Results | | | |
|---|---|---|---|---|---|---|
| Acetals (percent) | Initiator (percent) | Irradiation | Time (hr.) | Yield (percent) | $K_{222}$ (percent/min.) | $(\eta)$ |
| Methylal (1.0) | Carbon disulfide ($10^{-2}$) | Nonirradiated | 1 | 90 | 0.42 | 0.5 |
| Do | Carbon disulfide ($10^{-1}$) | do | 1 | 94 | 0.20 | 1.0 |
| 1,3-dioxolane (5.0) | Carbon disulfide ($10^{-3}$) | do | 1 | 50 | 0.27 | 0.6 |
| Do | Carbon disulfide ($10^{-2}$) | do | 1 | 90 | 0.25 | 1.3 |
| Do | Carbon disulfide ($10^{-1}$) | do | 1 | 99 | 0.25 | 1.3 |
| (Control) | Carbon disulfide ($10^{-2}$) | do | 2 | 5 | | |
| Do | Carbon disulfide ($10^{-4}$) | do | 2 | 2 | | |
| Do | do | Irradiated | 2 | 97 | 1.20 | 1.1 |
| 1,3-dioxolane (3.0) | Sulfur ($10^{-4}$) | do | 2 | 90 | 0.38 | 0.8 |
| Do | Sulfur ($10^{-3}$) | do | 2 | 100 | 0.50 | 0.8 |
| Do | Sulfur ($10^{-4}$) | Nonirradiated | 2 | 6 | | 3.0 |
| Do | Sulfur ($10^{-3}$) | do | 2 | 9 | | 3.1 |

Example 4

To 1 g. of tetraoxane purified by sublimation, 0.1% of carbon disulfide, 5.0% of 1,3-dioxolane and 0.5% of methylal were added and the mixture was heated at 105° C. for 1 hour for polymerization. After polymerization was finished, the reaction mixture was treated in the same way as in Example 1 and a white crystalline polymer was obtained in 100% yield. The $K_{222}$ (percent/min.) value was 0.15 and $[\eta]$ was 0.8 When the above experiment was repeated except that 5.5% of 1,3-dioxolane was employed instead of the combined use of dioxolane and methylal, the yield, the $K_{222}$ value and $[\eta]$ were 99%, 0.23 and 1.2 respectively.

Example 5

To 10 g. of tetraoxane purified by sublimation, 5.0% of dioxolane and 1.3% of carbon disulfide were added, and polymerization was carried out at various temperatures. Polymerization conditions and results are summarized in Table 4.

TABLE 4

| Polymerization conditions | | | Results | | |
|---|---|---|---|---|---|
| Temp. (° C.) | Time (hr.) | Phase | Yield (percent) | $K_{222}$ (percent/min.) | $(\eta)$ |
| 90 | 2 | Solid | 10 | 0.55 | 0.7 |
| 120 | 2 | do | 98 | 0.23 | 1.0 |
| 60 | 1 | Liquid (methylene chloride solution) | 86 | 0.90 | 0.3 |
| 90 | 1 | do | 93 | 0.85 | 0.4 |
| 100 | 1 | do | 97 | 0.80 | 0.5 |
| 120 | 1 | Liquid (without solvent) | 100 | 0.50 | 0.9 |
| 120 | 1 | Liquid (n-hexane solution) | 91 | 0.43 | 1.1 |
| 120 | 1 | Liquid (cyclohexane solution) | 81 | 0.45 | 1.0 |

Example 6

One gram of tetraoxane purified by sublimation was put in a glass ampoule, cyclohexene sulfide was admixed thereto, and further methylal or 1,3-dioxolane was added, and the ampoule was sealed in air. The ampoule was irradiated with $1 \times 10^6$ rad gamma rays and thereafter was kept in a heating bath of 105° C. for 2 hours. After polymerization was finished the reaction mixture was washed with acetone so as to remove unreacted tetraoxane and additives. And the residue was dried in a vacuum dryer. Amounts of the used additives and results are shown in Table 5.

TABLE 5

| Amount of additives | | Results | | |
|---|---|---|---|---|
| Cyclohexane sulfide (percent) | Acetals (percent) | Yield (percent) | $K_{222}$ | $(\eta)$ |
| 0.1 | Methylal (0.1) | ~100 | 0.07 | 2.1 |
| 0.1 | Methylal (2.0) | ~100 | 0.04 | 1.0 |
| 0.1 | 1,3-dioxolane (0.5) | ~100 | 0.05 | 3.8 |
| 0.1 | 1,3-dioxolane (3.0) | ~100 | 0.05 | 2.6 |
| 1.0 | 1,3-dioxolane (1.0) | ~100 | 0.04 | 2.3 |
| 0.1 (Control) | | 99 | 0.20 | 4.0 |
| 1.0 (Control) | | 99 | 0.21 | 3.7 |
| (Control) | Methylal (0.1) | 40 | 0.80 | 1.2 |
| Do | 1,3-dioxolane (1.0) | 46 | 0.75 | 1.3 |
| Do | | 38 | 1.16 | 1.3 |

Example 7

Polymerization was carried out for 6 hours at 105° C. in the same way as in Example 6 by using propylene sulfide instead of cyclohexene sulfide, and methylal and ethylal as the acetal. The amounts of additives and results are shown in Table 6.

TABLE 6

| Amount of additives | | Results | | |
|---|---|---|---|---|
| Propylene sulfide (percent) | Acetals (percent) | Yield (percent) | $K_{222}$ | $(\eta)$ |
| 0.5 | Methylal (1.0) | 99 | 0.06 | 1.7 |
| 1.0 | Methylal (0.1) | 99 | 0.12 | 3.2 |
| 1.0 | Methylal (2.0) | ~100 | 0.05 | 1.0 |
| 2.0 | Ethylal (1.0) | 99 | 0.04 | 1.6 |
| 1.0 (Control) | | ~100 | 0.22 | 2.7 |
| (Control) | Methylal (1.0) | 50 | 0.72 | 0.9 |
| Do | Ethylal (1.0) | 40 | 0.74 | 1.2 |

Example 8

Using ethylene sulfide instead of cyclohexene sulfide, and methylal and 1,3-dioxane as the acetal, polymerization was carried out in the same way as in Example 6. Conditions and results are summarized in Table 7.

TABLE 7

| Polymerization conditions | | Results | | | | |
|---|---|---|---|---|---|---|
| Ethylene sulfide, amount of addition (percent) | Acetals, amount of addition (percent) | Dose (rad) | Temp. (° C.) | Time (hr.) | Yield (percent) | $K_{222}$ | $(\eta)$ |
| 0.05 | 1,3 dioxane (3.) | $4 \times 10^6$ | 110 | 1 | 95 | 0.08 | 1.4 |
| 1.0 | Methylal (0.1) | $1 \times 10^6$ | 105 | 24 | 99 | 0.09 | 2.3 |
| 1.0 | Methylal (1.0) | $1 \times 10^6$ | 105 | 24 | 99 | 0.09 | 2.3 |
| 1.0 (Control) | | $1 \times 10^6$ | 105 | 24 | 54 | 0.39 | 1.9 |
| (Control) | 1,3 dioxane (3.0) | $4 \times 10^6$ | 110 | 1 | 29 | 0.81 | 0.8 |
| Do | | $4 \times 10^6$ | 110 | 1 | 47 | 1.17 | 1.4 |

Example 9

In the same way as in Example 7, but using ethylal as the acetal, with temperature and atmosphere varied, polymerization was carried out. Conditions and results of polymerization are summarized in Table 8.

TABLE 8

| Propylene sulfide, amount of addition (percent) | Ethylal, amount of addition (percent) | Dose (rad) | Temp. (° C.) | Time (hr.) | Atmosphere | Yield (percent) | $K_{222}$ | $(\eta)$ |
|---|---|---|---|---|---|---|---|---|
| 2.0 | 1.0 | 1×10⁶ | 90 | 6 | Air | 68 | 0.19 | 1.5 |
| 1.0 | 1.0 | 1×10⁶ | 130 | 6 | Air | 98 | 0.31 | 1.4 |
| 2.0 | 1.0 | 1×10⁶ | 105 | 6 | Vacuum | 33 | 0.90 | 1.9 |
| 2.0 (Control) | | 1×10⁶ | 90 | 6 | Air | 60 | 0.47 | 2.2 |
| (Control) | 1.0 | 1×10⁶ | 90 | 6 | Air | 39 | 0.90 | 0.9 |

Example 10

One gram of tetraoxane purified by sublimation was put in a glass ampoule, 0.05% of ethylene sulfide and 3.0% of 1,3-dioxane were admixed thereto, and the ampoule was sealed. The ampoule was kept on a heating bath of 100° C., and was irradiated with gamma rays from Co–60 at the dose rate of $5 \times 10^4$ rad/hr. for 2 hours. A separate sample was irradiated with a high pressure mercury lamp (Toshiba Type HLS–4002, H–400–F) instead of gamma rays. After polymerization was finished, the reaction mixture was treated as in Example 6. Results are shown in Table 9.

TABLE 9

| Species of radiations | Polymerization yield (percent) | $K_{222}$ | $(\eta)$ |
|---|---|---|---|
| Gamma-rays | 99 | 0.65 | 1.6 |
| Ultraviolet light | 80 | 0.22 | 1.4 |
| (Control): | | | |
| Gamma-rays (without ethylene sulfide) | <1 | | |
| Gamma-rays (without 1,3-dioxane) | 97 | 0.80 | 1.5 |
| UV light (without ethylene sulfide) | <1 | | |
| UV light (without 1,3-dioxane) | 71 | 0.81 | 1.3 |

Example 11

Ten grams of tetraoxane purified by sublimation was irradiated with $1 \times 10^5$ rad of gamma rays from Co–60. Then it was put in a glass ampoule, and 1.0% of propylene sulfide and 1.0% of methylal were admixed thereto, and the ampoule was sealed. The ampoule was kept in a heating bath of 105° C. for 6 hours. After polymerization was finished, the reaction mixture was treated in the same way as in Example 6, and a white crystalline polymer was obtained, in 98% polymerization yield. The $K_{222}$ and $[\eta]$ of the polymer were 0.04 and 1.9 respectively. Separately, tetraoxane, propylene sulfide and methylal were sealed in an ampoule and irradiated by gamma rays. The same polymerization operation was repeated. Approximately the same result was obtained.

Example 12

Two grams of tetraoxane purified by recrystallization was polymerized in liquid phase. Conditions and results are shown in Table 10.

TABLE 10

| Solvent | Cyclohexene sulfide, amount of addition (percent) | Methylal, amount of addition (percent) | Dose (rad) | Temp. (° C.) | Time (hr.) | Yield (percent) | $K_{222}$ | $(\eta)$ |
|---|---|---|---|---|---|---|---|---|
| No solvent | 0.1 | 1.0 | | 130 | 2 | 99 | 0.41 | 1.1 |
| Cyclohexane 100% | 0.1 | 1.0 | | 100 | 2 | 29 | 0.88 | 1.7 |
| Do | 0.1 | 1.0 | 1×10⁵ | 100 | 1 | 70 | 0.23 | 0.9 |
| | | | | (In-source polymerization) | | | | |
| (Control): | | | | | | | | |
| No solvent | 0.1 | | | 130 | 2 | 91 | 0.80 | 1.7 |
| Do | | 1.0 | | 130 | 2 | <1 | | |
| Cyclohexane 100% | 1.0 | | 1×10⁵ | 100 | 1 | 65 | 0.50 | 0.9 |
| | | | | (In-source ploymerization) | | | | |
| Do | | 1.0 | 1×10⁵ | 100 | 1 | <1 | | |

Reference example

To 1 gram of trioxane, 1.0% propylene sulfide and 1.0% methylal were added, and the vessel (ampoule) was sealed. The ampoule was subjected to gamma-rays irradiation of $1 \times 10^6$ rad from Co–60 at room temperature, and was kept at 55° C. for 4 hours for polymerization. After polymerization, the reaction mixture was treated as in the above examples. A white polymer, the $K_{222}$ and $[\eta]$ of which are respectively 0.45 and 1.3, was obtained in the polymerization yield of 55%.

Example 13

One gram of tetraoxane purified by sublimation was put in an ampoule, and methyl thiocyanate, ethyl thiocyanate or benzyl thiocyanate was added together with methylal, ethylal, 1,3-dioxolane or 1,3-dioxane, and the ampoule was sealed. The reaction mixture was irradiated with $10^4$–$10^6$ rad of gamma rays from Co–60 at —78° C., and kept at 106° C. for polymerization. After polymerization, the reaction mixture was washed with acetone, and a white crystalline polymer was obtained upon drying under reduced pressure. The melting point of the polymer was 166–172° C. Polymerization conditions and results are summarized in Table 11.

TABLE 11

| Thiocyanate, amount of addition (percent) | Acetals, amount of addition (percent) | Dose (rad) | Time (hr.) | Yield (percent) | $K_{222}$ | $(\eta)$ |
|---|---|---|---|---|---|---|
| Methylthiocyanate (3.0) | Methylal (0.01) | | 2 | 81 | 0.23 | 2.1 |
| Methylthiocyanate (5.0) | Methylal (1.0) | | 2 | 89 | 0.12 | 1.5 |
| Methylthiocyanate (3.0) | Methylal (0.01) | 10⁵ | 2 | 99 | 0.23 | 2.6 |
| Do | Methylal (1.0) | 10⁶ | 2 | 99 | 0.05 | 1.6 |
| Ethylthiocyanate (3.0) | Ethylal (1.0) | 10⁶ | 4 | 99 | 0.06 | 1.5 |
| Do | 1,3-dioxane (3.0) | 10⁴ | 4 | 99 | 0.10 | 1.8 |
| Benzylthiocyanate (1.0) | 1,3-dioxolane (5.0) | 10⁵ | 2 | 98 | 0.27 | 1.9 |
| (Control): | | | | | | |
| Methylthiocyanate (3.0) | | 10⁶ | 2 | 99 | 0.38 | 1.6 |
| | Methylal (3.0) | 10⁶ | 1 | 20 | 0.50 | 1.5 |
| Methylthiocyanate (3.0) | | | 2 | 55 | 0.43 | 3.2 |

Example 14

Polymerization was carried out in the same way as in Example 13. But various bath temperatures were employed. Polymerization conditions and results are summarized in Table 12.

1.0% of ethylal were added thereto, and the ampoule was sealed in air. The mixture was melt-mixed at 130° C., cooled to −78° C. and irradiated with $5 \times 10^6$ rad gamma rays from Co–60, followed by polymerization for 24 hours in a 105° C. heating bath. A polymer of $K_{222}=0.10$ and $[\eta]=0.8$ was obtained in 39% yield.

TABLE 12

| Polymerization conditions | | | | | Results | | |
|---|---|---|---|---|---|---|---|
| Thiocyanate, amount of addition (percent) | Acetals, amount of addition (percent) | Dose (rad) | Temp. (° C.) | Time (hr.) | Yield (percent) | $K_{222}$ | $(\eta)$ |
| Ethylthiocyanate (1.0) | 1,3-dioxane (3.0) | $10^6$ | 90 | 6 | 94 | 0.23 | 1.7 |
| Ethylthiocyanate (3.0) | Methylal (1.0) | $10^5$ | 105 | 4 | ~100 | 0.05 | 1.8 |
| Benzylthiocyanate (1.0) | 1,3-dioxolane (5.0) | $10^5$ | 120 | 2 | 60 | 0.33 | 2.9 |
| Benzylthiocyanate (Control) (1.0) | | $10^5$ | 120 | 2 | 42 | 0.50 | 3.4 |

Example 15

Ten grams of tetraoxane together with 1.0% of methylal and 3.0% of methyl thiocyanate was put in a glass ampoule and was polymerized in liquid phase. After polymerization, the reaction mixture was treated as in Example 13. Polymerization conditions and results are shown in Table 13.

TABLE 13

| Polymerization conditions | | | | Results | | |
|---|---|---|---|---|---|---|
| Solvent (percent) | Temp. (° C.) | Dose (rad) | Time (hr.) | Yield (percent) | $K_{222}$ | $(\eta)$ |
| No solvent | 130 | | 2 | 89 | 0.27 | 1.3 |
| Cyclohexane (100) | 100 | | 2 | 29 | 0.48 | 1.5 |
| Do | 100 | $10^5$ (In source) | 1 | 65 | 0.33 | 1.1 |
| (Control): No solvent and no methylal | 130 | | 2 | 81 | 1.01 | 1.6 |

Example 16

Polymerization was carried out in the same way as in Example 13, bupt ultraviolet light from a high pressure mercury lamp (Toshiba HLS–4002) were utilized. When 3% ethyl thiocyanate and 1.0% ethylal were added to tetraoxane and the mixture was irradiated on a heating bath of 100° C., a white polymer, the $K_{222}$ and $[\eta]$ of which were respectively 0.23 and 1.8, was obtained in the polymerization yield of 95%. When ethylal was not added, the polymerization yield was 80% and the $K_{222}$ and $[\eta]$ of the obtained polymer were 0.43 and 2.0 respectively.

Example 17

One gram of tetraoxane purified by sublimation was put in a glass ampoule, 1.0% of ethyl isothiocyanate was admixed thereto, and methylal or 1,3-dioxolane was further added thereto. The ampoule was sealed in air and irradiated with $1 \times 10^6$ rad gamma rays from Co–60 at −78° C. Polymerization was carried out for 4 hours in a 105° C. heating bath. After the polymerization, the product was treated in the same way as in Example 1.

When 1.0% of methylal was added, a white polymer of $K_{222}=0.12$ and $[\eta]=1.3$ was obtained in 81% yield. When 3.0% of 1,3-dioxolane was added, a white polymer of $K_{222}=0.10$ and $[\eta]=1.4$ was obtained in 82% yield.

When neither methyl nor 1,3-dioxolane was employed in the polymerization, the yield was 82%, and $K_{222}$ value and $[\eta]$ of the polymer were 0.45 and 3.8 respectively.

Example 18

One gram of tetraoxane purified by sublimation was put in a glass ampoule, and 1.0% of ethylenethiourea and The polymerization was repeated in the same way except employing 3.0% of 1,3-dioxolane instead of ethylal and $1 \times 10^5$ rad gamma rays. The yield was 40%, and $K_{222}$ value and $[\eta]$ of the polymer were 0.11 and 2.4 respectively.

When neither ethylal nor 1,3-dioxolane was employed in the polymerization, the yield, $K_{222}$ value and $[\eta]$ were 20%, 0.10 and 2.5 respectively at the radiation dose of $5 \times 10^6$ rad; and 15%, 0.13 and 3.1 respectively at the dose of $1 \times 10^5$ rad.

Example 19

The mixture of 0.3 part of trimethylenetrisulfone and 1 part by weight of trioxane (employed as the fusing medium for the former trisulfone) was melt-mixed and then solidified. Then, tetraoxane was added to the mixture to make the ratio of trimethyltrisulfone 2.0% of the amount of tetraoxane, and was uniformly mixed by using a mortar. The uniform mixture was put in a glass ampoule, and methylal or 1,3-dioxane was further added thereto. The ampoule was sealed in air and kept in a 70° C. heating bath for 30 minutes. No polymer was observed in this stage of heating.

Then, the ampoule was kept in a 105° C. heating bath for 4 hours and a polymer was obtained as follows. The yield, $K_{222}$ value and $[\eta]$ of the polymer were 79%, 0.26 and 1.1 respectively when 1.0% of methylal was added; and were 84%, 0.22 and 1.3 respectively when 3.0% of 1,3-dioxane was added.

Example 20

This example shows a liquid phase polymerization employing trimethylenesulfone. One gram of tetraoxane was put in a glass ampoule and mixed with 5.0% of trimethylenetrisulfone, 1.0% of ethylal and 100% of 1,4-dioxane. The ampoule was sealed in air and heated at 105° C. until the mixture was dissolved and the liquid became transparent, and further kept at 105° C. for 4 hours for polymerization in liquid phase. After the polymerization was finished, the unreacted substances were removed by washing by acetone and the product was dried. A polymer of $K_{222}$ value=0.07 and $[\eta]=1.3$ was obtained in 91% yield.

Example 21

Polymerization was carried out at 105° C. for 4 hours after irradiating tetraoxane first and adding ethyl thiocyanate and an acetal thereto. Another polymerization was carried out at 105° C. for 4 hours after irradiating ethyl thiocyanate first and adding it to the mixture of tetraoxane and an acetal. The irradiation was effected by gamma rays from Co–60 or ultra-violet light from a mercury lamp (Toshiba HLS–4002 Type). The polymerization conditions and results are shown in Table 14.

TABLE 14

| Irradiated substance | Polymerization conditions | | | Results | | |
| --- | --- | --- | --- | --- | --- | --- |
| | Ethyl thiocyanate (percent) | Acetals (percent) | Irradiation | Yield (percent) | $K_{222}$ | $[\eta]$ |
| Tetraoxane | 3.0 | Methylal (0.5) | $10^5$ rad ($-78°$ C.) | 94 | 0.10 | 1.8 |
| Ethyl thiocyanate | 3.0 | do | do | 89 | 0.11 | 1.5 |
| Do | 3.0 | 1,3-dioxane (3.0) | do | 92 | 0.08 | 1.6 |
| Do | 3.0 | Ethylal (1.0) | UV light* (at room temp. for 1 hour) | 78 | 0.17 | 1.3 |
| None (control) | 3.0 | do | | <1 | | |

*The irradiation was effected at the distance of 10 cm. by UV light of longer than 3,100 A. in wave length.

What is claimed is:

1. A process for polymerizing tetraoxane at a temperature ranging from 30° to 150° C. by employing an initiator consisting of sulfur or an organic sulfur compound selected from the group consisting of a thioaldehyde, a thioketone, a thioalcohol, a thiocarbonic anhydride, a thioether including thiiranes, a thiocarbonic ester, a thioamide, a thiourea, a thiourea derivative, a thiocyanate, an isothiocyanate, an alkylxanthogenate, a sulfate, a sulfite, an alkylsulfone, an alkylsulfoxide, a sulfonium compound, a thiophene-derivative-s-oxide, a dithiorane-derivative-s-oxide, an oxathian-derivative-s-oxide, and a trithianoxide, in the presence of an additive consisting of at least one acetal represented by the following general Formulas I and/or II:

(I)
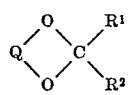

wherein Q is a member selected from the group consisting of an unsubstituted or substituted aliphatic hydrocarbon residue having 2 to 10 carbon atoms and an unsubstituted or substituted aliphatic hydrocarbon residue containing C—O—C linkages and having 2 to 10 carbon atoms, the substituent on the aliphatic hydrocarbon residue being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms;

(II)
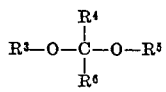

wherein $R^3$ and $R^5$ each are members selected from the group consisting of an aliphatic hydrocarbon residue having 1 to 4 carbon atoms and a substituted aliphatic hydrocarbon residue having 1 to 8 carbon atoms, the substituent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms.

2. A process as set forth in claim 1, in which the amount of sulfur or an organic sulfur compound is $10^{-6}$—10% by weight of tetraoxane and amount of an acetal or acetals is $10^{-3}$—15% by weight of tetraoxane.

3. A process as set forth in claim 1, in which polymerization is further promoted by employing an ionizing radiation or an ultraviolet light.

4. A process as set forth in claim 1, in which polymerization is carried out in solid phase.

5. A process as set forth in claim 1, in which tetraoxane is irradiated by an ionizing radiation or an ultraviolet light, and then the initiator and additive are added to the irradiated tetraoxane, and the mixture is polymerized in solid phase.

6. A process as set forth in claim 1, in which the initiator is irradiated by an ionizing radiation or an ultraviolet light and then added to tetraoxane, and the mixture is polymerized in solid or liquid phase.

7. A process as set forth in claim 1, in which the mixture of tetraoxane, the initiator and the additive is irradiated by an ionizing radiation or an ultraviolet light and then polymerized in solid phase.

8. A process as set forth in claim 1, in which both an acyclic acetal and a cyclic acetal are employed.

9. A process as set forth in claim 1, in which at least one organic sulfur compound selected from the group consisting of ethylene sulfide, propylene sulfide, 1-butene sulfide, isobutene sulfide, 2-butene sulfide, trimethylethylene sulfide, tetramethylethylene sulfide, cyclopentene sulfide, cyclohexene sulfide, 4-methylcyclohexene sulfide, cycloheptene sulfide, cyclooctene sulfide, styrene sulfide, 3-mercaptopropylene sulfide, and 3-chloropropylene sulfide, is used as thiiranes.

10. A process as set forth in claim 9, in which polymerization is further promoted by employing an ionizing radiation or an ultraviolet light.

11. A process as set forth in claim 1, in which at least one thiocyanate selected from the group consisting of methyl thiocyanate, ethyl thiocyanate, n-propyl thiocyanate, isopropyl thiocyanate, n-butyl thiocyanate, isobutyl thiocyanate, n-amyl thiocyanate, isoamyl thiocyanate, allyl thiocyanate, benzyl thiocyanate, and phenyl thiocyanate, is used.

12. A process as set forth in claim 11, in which polymerization is further promoted by employing an ionizing radiation or an ultraviolet light.

13. A process as set forth in claim 1, in which trimethylenetrisulphoxide or trimethylenetrisulfone is used as a trithianoxide.

14. A process as set forth in claim 1, in which at least one isothiocyanate selected from the group consisting of methyl isothiocyanate, ethyl isothiocyanate, n-propyl isothiocyanate, isopropyl isothiocyanate, n-butyl isothiocyanate, benzyl isothiocyanate, and phenyl isothiocyanate, is used.

15. A process as set forth in claim 14, in which polymerization is further promoted by employing an ionizing radiation or an ultraviolet light.

16. A process as set forth in claim 1, in which the acetal is selected from the group consisting of dimethoxymethane (methylal), diethoxymethane (ethylal), 1,1-dimethoxyethane, 1,1 - diethoxyethane, 1,1 - diethoxypropane, dipropoxymethane, dibutoxymethane, methoxybutoxymethane, 1,1 - diethoxypropane, 1,1 - diethoxybutane, 2,2 - dimethoxypropane, 1,3 - dioxolane, 1,3-dioxane, 1,3 - dioxepane, 1,3 - dioxecane, 1,3,5 - trioxepane, 1,3,6 - trioxocane, 4 - methyl - 1,3 - dioxolane, 4 - phenyl - 1,3 - dioxane, 5 - ethyl - 4 - phenyl - 1,3-dioxane, 4 - methyl - 4 - phenyl - 1,3 - dioxane, 2-methyl-4 - methylene - 1,3 - dioxolane, 1,3 - dioxep - 5 - ene, 1,3 - dioxen - 6 - ene, 5 - ethyl - 1,3 - dioxep-5-ene, and 2-isopropyl-1,3-dioxep-5-ene.

17. An oxymethylene polymer produced by the process which comprises polymerizing tetraoxane at a temperature ranging from 30° to 150° C. in the presence of sulfur or an organic sulfur compound selected from the group consisting of a thioaldehyde, a thioketone, a thioalcohol, a thiocarbonic anhydride, a thioether including thiiranes, a thiocarbonic ester, a thioamide, a thiourea, a thiourea derivative, a thiocyanate, an isothiocyanate, an alkylxanthogenate, a sulfate, a sulfite, an alkylsulfonate, an alkylsulfoxide, a sulfonium compound, a thiophene-derivative-s-oxide, a dithiorane-derivative-s-oxide, an oxathian-derivative-s-oxide, and a trithianoxide, and at least one acetal represented by the following Formulas I and/ or II:

(I) 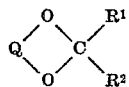

wherein Q is a member selected from the group consisting of an unsubstituted or substituted aliphatic hydrocarbon residue having 2 to 10 carbon atoms and an unsubstituted or substituted aliphatic hydrocarbon residue containing C—O—C linkages and having 2 to 10 carbon atoms, the substituent on the aliphatic hydrocarbon residue being selected from the group consisting of alkyl, alkenyl, phenyl, and halogens; and $R^1$ and $R^2$ each are members selected from the group consisting of a hydrogen atom or an aliphatic hydrocarbon residue having 1 to 3 carbon atoms;

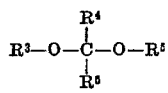

wherein $R^3$ and $R^5$ each are members selected from the group consisting of an aliphatic hydrocarbon residue having 1 to 4 carbon atoms and a substituted aliphatic hydrocarbon residue having 1 to 8 carbon atoms, the substituent being selected from the group consisting of alkyl, alkoxy, and halogens; and $R^4$ and $R^6$ each are members selected from the group consisting of a hydrogen atom and an aliphatic hydrocarbon residue having 1 to 3 carbon atoms.

18. An oxymethylene polymer as set forth in claim 17, in which both an acyclic acetal and a cyclic acetal are employed.

19. An oxymethylene polymer as set forth in claim 17, in which polymerization is further promoted by employing an ionizing radiation or an ultraviolet light.

20. An oxymethylene polymer as set forth in claim 19, in which the acetal is selected from the group consisting of dimethoxymethane (methylal), diethoxymethane (ethylal), 1,1 - dimethoxyethane, 1,1 - diethoxyethane, 1,1 - diethoxypropane, dipropoxymethane, dibutoxymethane, methoxybutoxymethane, 1,1 - dibutoxypropane, 1,1 - diethoxybutane, 2,2 - dimethoxypropane, 1,3 - dioxolane, 1,3 - dioxane, 1,3 - dioxepane, 1,3 - dioxecane, 1,3,5 - trioxepane, 1,3,6 - trioxocane, 4-methyl-1,3 - dioxolane, 4 - phenyl - 1,3 - dioxane, 5 - ethyl - 4-phenyl - 1,3 - dioxane, 4 - methyl - 4 - phenyl - 1,3-dioxane, 2 - methyl - 4 - methylene - 1,3 - dioxolane, 1,3 - dioxep - 5 - ene, 1,3 - dioxen - 6 - ene, 5 - ethyl-1,3 - dioxep - 5 - ene, and 2 - isopropyl 1,3-dioxep - 5-ene.

21. An oxymethylene polymer as set forth in claim 20, in which the organic sulfur compound is selected from the group consisting of a thiirane, a thiocyanate, an isothiocyanate, thiourea, a thiourea derivative and a trithianoxide.

References Cited

UNITED STATES PATENTS 3,347,764  10/1967  Matsumoto et al. ___ 204—159.21
3,020,064  2/1962   Behrends et al. ____ 260—67 FP

OTHER REFERENCES

Free Radical Induces Cationic Polymerization, Chemical & Engineering News, Sept. 6, 1966, pp. 40–41.

SAMUEL H. BLECH, Primary Examiner

R. B. TURER, Assistant Examiner

U.S. Cl. X.R.

260—67 FP